United States Patent
Belotserkovsky et al.

(10) Patent No.: US 6,704,374 B1
(45) Date of Patent: Mar. 9, 2004

(54) LOCAL OSCILLATOR FREQUENCY CORRECTION IN AN ORTHOGONAL FREQUENCY DIVISION MULTIPLEXING SYSTEM

(75) Inventors: Maxim B. Belotserkovsky, Indianapolis, IN (US); Louis Robert Litwin, Jr., Carmel, IN (US)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/505,162

(22) Filed: Feb. 16, 2000

(51) Int. Cl.$^7$ .............................. H04L 27/14; H04L 7/00
(52) U.S. Cl. .................. 375/326; 375/343; 375/355
(58) Field of Search ........................... 370/210, 208; 708/403; 375/136, 137, 326, 260, 316, 355, 343

(56) References Cited

U.S. PATENT DOCUMENTS

| | | | |
|---|---|---|---|
| 5,444,697 A | 8/1995 | Leung et al. | 370/19 |
| 5,608,764 A | 3/1997 | Sugita et al. | 375/344 |
| 5,652,772 A | 7/1997 | Isaksson et al. | 375/367 |
| 5,694,389 A | 12/1997 | Seki et al. | 370/208 |
| 5,710,792 A | 1/1998 | Fukawa et al. | 375/229 |
| 5,726,974 A | 3/1998 | Kunieda et al. | 370/206 |
| 5,732,113 A | 3/1998 | Schmidl et al. | 375/355 |
| 5,771,224 A | 6/1998 | Seki et al. | 370/206 |
| 5,774,450 A | 6/1998 | Harada et al. | 370/206 |
| 5,787,123 A | 7/1998 | Okada et al. | 375/324 |
| 5,790,516 A | 8/1998 | Gudmundson et al. | 370/210 |
| 5,812,523 A | 9/1998 | Isaksson et al. | 370/208 |
| 5,920,598 A | 7/1999 | Hyakudai et al. | 375/316 |
| 5,946,292 A * | 8/1999 | Tsujishita et al. | 370/204 |

FOREIGN PATENT DOCUMENTS

| | | | |
|---|---|---|---|
| EP | 000729250 A2 * | 2/1996 | |
| EP | 001126673 A2 * | 1/2001 | |
| WO | WO 99/27671 | 6/1999 | H04J/11/00 |

OTHER PUBLICATIONS

H. Nogami et al., "A Frequency and Timing Period Acquisition Technique for OFDM Systems", The Sixth IEEE International Symposium on Personal, Indoor and Mobile Radio Communications, PIMRC '95, Toronto, Canada, Sep. 27–29, 1995, pp. 1010–1015.

(List continued on next page.)

*Primary Examiner*—Tesfaldet Bocure
(74) *Attorney, Agent, or Firm*—Joseph S. Tripoli; Ronald H. Kurdyla; Vincent E. Duffy

(57) ABSTRACT

An Orthogonal Frequency Division Multiplexing (OFDM) receiver that detects and corrects a carrier frequency offset of a received signal is provided. The OFDM receiver samples an incoming signal in the time domain and correlates the samples with a stored version of a training or reference symbol to generate a correlation sequence. A correlation peak is detected in the correlation sequence and the index of the correlation peak is set as a reference point. The OFDM receiver acquires a sample of the incoming signal that is a predetermined distance from the reference point. Next, the phase difference between the acquired sample and the local oscillator is computed. Afterwards, the frequency of the local oscillator is adjusted to reduce the computed phase difference. The acquired sample has a known phase that is equal to the phase of the local oscillator in the absence of a carrier frequency offset. Thus, reducing the phase difference between the predetermined sample and the local oscillator causes the carrier frequency offset to converge towards zero.

18 Claims, 5 Drawing Sheets

OTHER PUBLICATIONS

J. Rinne et al., "An Equalization Method for Orthogonal Frequency Division Multiplexing Systems In Channels With Multipath Propagation, Frequency Offset And Phase Noise", IEEE GLOBECOM 1996, London, Nov. 18–22, 1996, Conference Record vol.2 of 3, pp. 1442–1446.

J. A. C. Bingham, "Multicarrier Modulation For Data Transmission: An Idea Whose Time Has Come", May 1990—IEEE Communications Magazine.

J. A. Cioffi, "A Multicarrier Primer" (Tutorial), Amati Communications Corporation and Stanford University, pp. 1–18.

D. K. Kim et al., "A New Joint Algorithm Of Symbol Timing Recovery and Sampling Clock Adjustment For OFDM Systems", IEEE Transactions on Consumer Electronics, vol. 44, No. 3, Aug. 1998, pp. 1142–1149.

W. Bretl et al., "VSB Modem Subsystem Design For Grand Alliance Ditital Television Receivers", IEEE Transactions on Consumer Electronics, vol. 41, No. 3, Aug. 1995, pp. 773–786.

* cited by examiner

LOCAL OSCILLATOR FREQUENCY CORRECTION IN AN ORTHOGONAL FREQUENCY DIVISION MULTIPLEXING SYSTEM

FIELD OF THE INVENTION

The present invention relates to processing of orthogonal frequency division multiplexed (OFDM) signals.

BACKGROUND OF THE INVENTION

Orthogonal frequency division multiplexing (OFDM) is a robust technique for efficiently transmitting data over a channel. The technique uses a plurality of sub-carrier frequencies (sub-carriers) within a channel bandwidth to transmit the data. These sub-carriers are arranged for optimal bandwidth efficiency compared to more conventional transmission approaches, such as frequency division multiplexing (FDM), which waste large portions of the channel bandwidth in order to separate and isolate the sub-carrier frequency spectra and thereby avoid inter-carrier interference (ICI). By contrast, although the frequency spectra of OFDM sub-carriers overlap significantly within the OFDM channel bandwidth, OFDM nonetheless allows resolution and recovery of the information that has been modulated onto each sub-carrier.

The transmission of data through a channel via OFDM signals provides several advantages over more conventional transmission techniques. One advantage is a tolerance to multipath delay spread. This tolerance is due to the relatively long symbol interval Ts compared to the typical time duration of the channel impulse response. These long symbol intervals prevent inter-symbol interference (ISI). Another advantage is a tolerance to frequency selective fading. By including redundancy in the OFDM signal, data encoded onto fading sub-carriers can be reconstructed from the data recovered from the other sub-carriers. Yet another advantage is efficient spectrum usage. Since OFDM sub-carriers are placed in very close proximity to one another without the need to leave unused frequency space between them, OFDM can efficiently fill a channel. A further advantage is simplified sub-channel equalization. OFDM shifts channel equalization from the time domain (as in single carrier transmission systems) to the frequency domain where a bank of simple one-tap equalizers can individually adjust for the phase and amplitude distortion of each sub-channel. Yet another advantage is good interference properties. It is possible to modify the OFDM spectrum to account for the distribution of power of an interfering signal. Also, it is possible to reduce out-of-band interference by avoiding the use of OFDM sub-carriers near the channel bandwidth edges.

Although OFDM exhibits these advantages, prior art implementations of OFDM also exhibit several difficulties and practical limitations. One difficulty is the issue of determining and correcting for carrier frequency offset, a major aspect of OFDM synchronization. Ideally, the receive carrier frequency, $f_{cr}$, should exactly match the transmit carrier frequency, $f_{ct}$. If this condition is not met, however, the mis-match contributes to a non-zero carrier frequency offset, delta $f_c$, in the received OFDM signal. OFDM signals are very susceptible to such carrier frequency offset which causes a loss of orthogonality between the OFDM sub-carriers and results in inter-carrier interference (ICI) and a severe increase in the bit error rate (BER) of the recovered data at the receiver. The present invention is directed to the correction of this problem.

SUMMARY OF THE INVENTION

An OFDM receiver corrects a carrier frequency offset by computing a phase difference between a predetermined sample of a training sequence or reference symbol and a local oscillator, and adjusting the frequency of the local oscillator to reduce the computed phase difference.

DETAILED DESCRIPTION OF THE PREFERRED EMBODIMENT

The characteristics and advantages of the present invention will become more apparent from the following description, given by way of example.

Figure 1:
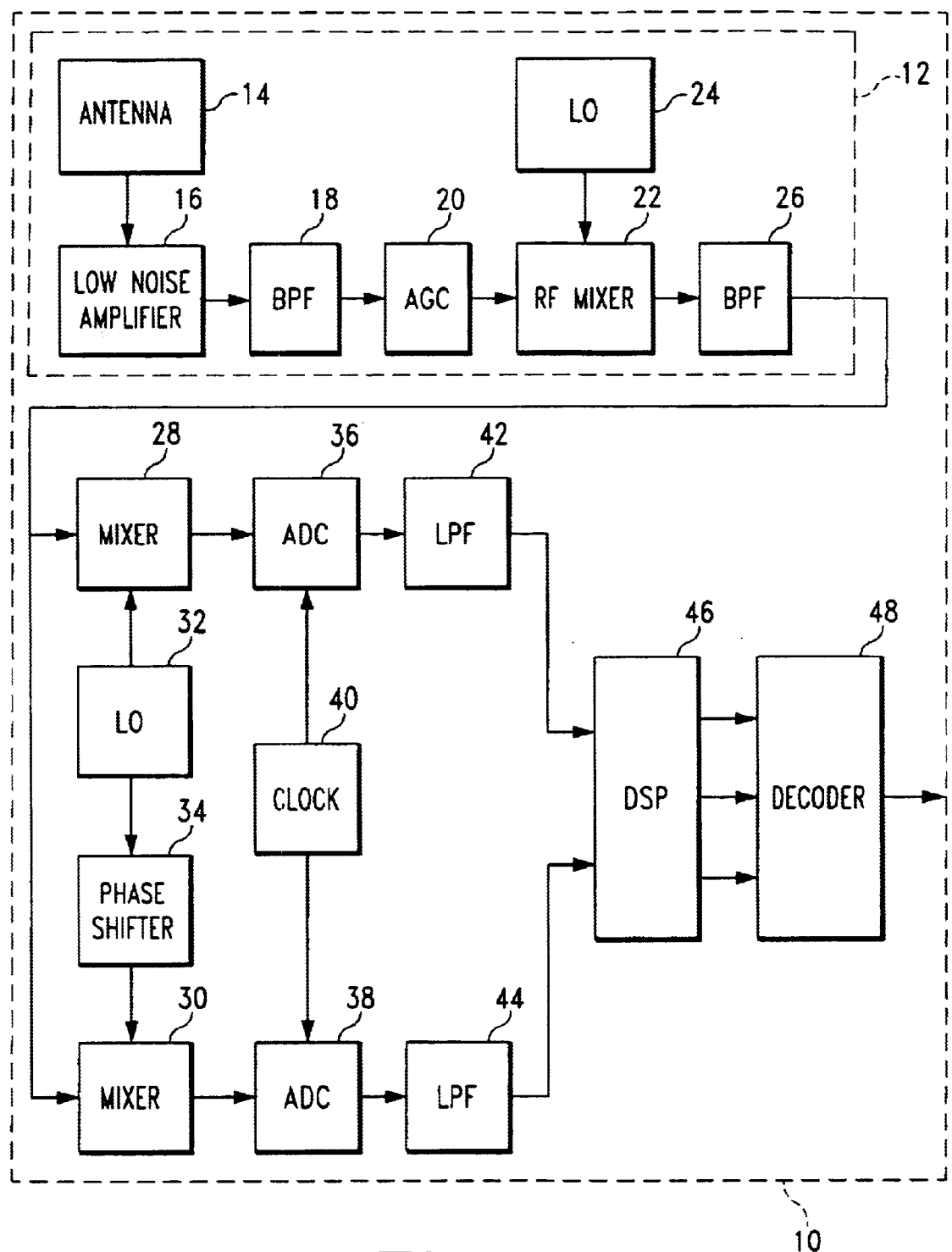
FIG. 1 is a block diagram of a conventional OFDM receiver.

Referring to FIG. 1, the first element of a typical OFDM receiver 10 is an RF receiver 12. Many variations of RF receiver 12 exist and are well known in the art, but typically, RF receiver 12 includes an antenna 14, a low noise amplifier (LNA) 16, an RF bandpass filter 18, an automatic gain control (AGC) circuit 20, an RF mixer 22, an RF carrier frequency local oscillator 24, and an IF bandpass filter 26.

Through antenna 14, RF receiver 12 couples in the RF OFDM-modulated carrier after it passes through the channel. Then, by mixing it with a receiver carrier of frequency $f_{cr}$ generated by RF local oscillator 24, RF receiver 12 downconverts the RF OFDM-modulated carrier to obtain a received IF OFDM signal. The frequency difference between the receiver carrier and the transmitter carrier contributes to the carrier frequency offset, delta $f_c$.

This received IF OFDM signal is coupled to mixer 28 and mixer 30 to be mixed with an in-phase IF signal and a 90° phase-shifted (quadrature) IF signal, respectively, to produce in-phase and quadrature OFDM signals, respectively. The in-phase IF signal that feeds into mixer 28 is produced by an IF local oscillator 32. The 90° phase-shifted IF signal that feeds into mixer 30 is derived from the in-phase IF signal of IF local oscillator 32 by passing the in-phase IF signal through a 90° phase shifter 34 before providing it to mixer 30.

The in-phase and quadrature OFDM signals then pass into analog-to-digital converters (ADCs) 36 and 38, respectively, where they are digitized at a sampling rate $f_{ck\_r}$ as determined by a clock circuit 40. ADCs 36 and 38 produce digital samples that form an in-phase and a quadrature discrete-time OFDM signal, respectively. The difference between the sampling rates of the receiver and that of the transmitter is the sampling rate offset, delta $f_{ck} = f_{ck\_r} - f_{ck\_t}$.

The unfiltered in-phase and quadrature discrete-time OFDM signals from ADCs 36 and 38 then pass through digital low-pass filters 42 and 44, respectively. The output of lowpass digital filters 42 and 44 are filtered in-phase and quadrature samples, respectively, of the received OFDM signal. In this way, the received OFDM signal is converted into in-phase ($q_i$) and quadrature ($p_i$) samples that represent the real and imaginary-valued components, respectively, of the complex-valued OFDM signal, $r_i = q_i + jp_i$. These in-phase and quadrature (real-valued and imaginary-valued) samples of the received OFDM signal are then delivered to DSP 46. Note that in some conventional implementations of receiver 10, the analog-to-digital conversion is done before the IF mixing process. In such an implementation, the mixing process involves the use of digital mixers and a digital frequency synthesizer. Also note that in many conventional implementations of receiver 10, the digital-to-analog conversion is performed after the filtering.

DSP 46 performs a variety of operations on the in-phase and quadrature samples of the received OFDM signal. These operations may include: a) synchronizing receiver 10 to the timing of the symbols and data frames within the received OFDM signal, b) removing the cyclic prefixes from the received OFDM signal, c) computing the discrete Fourier transform (DFT) or preferably the fast Fourier transform (FFT) of the received OFDM signal in order to recover the sequences of frequency-domain sub-symbols that were used to modulate the sub-carriers during each OFDM symbol interval, d) performing any required channel equalization on the sub-carriers, and e) computing a sequence of frequency-domain sub-symbols, $Y_k$, from each symbol of the OFDM signal by demodulating the sub-carriers of the OFDM signal by means of the FFT calculation. DSP 46 then delivers these sequences of sub-symbols to a decoder 48.

Decoder 48 recovers the transmitted data bits from the sequences of frequency-domain sub-symbols that are delivered to it from DSP 46. This recovery is performed by decoding the frequency-domain sub-symbols to obtain a stream of data bits which should ideally match the stream of data bits that were fed into the OFDM transmitter. This decoding process can include soft Viterbi decoding and/or Reed-Solomon decoding, for example, to recover the data from the block and/or convolutionally encoded sub-symbols.

Figure 2:
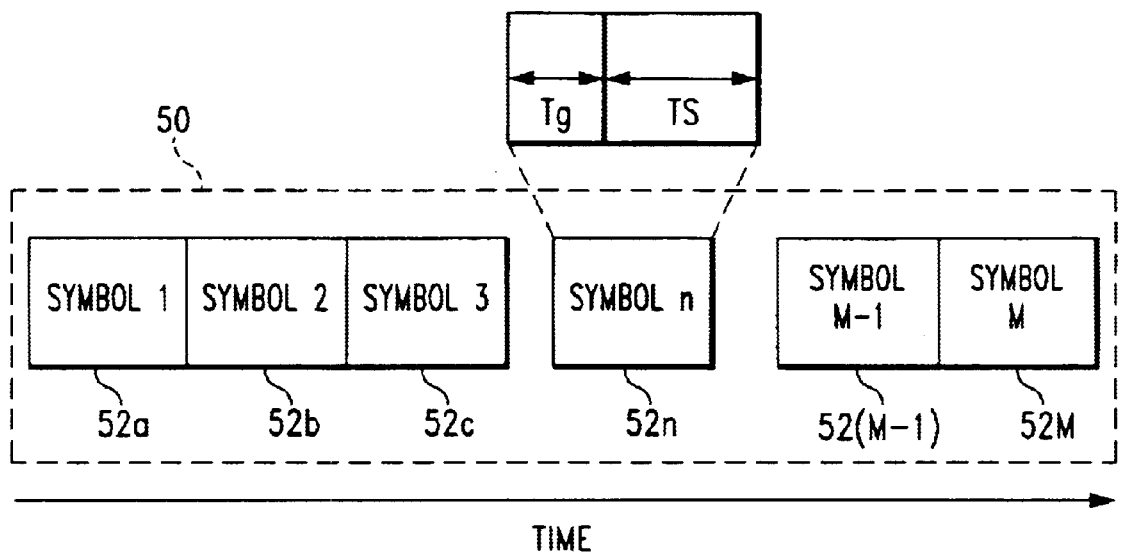
FIG. 2 illustrates a typical arrangement of OFDM symbols and their corresponding guard intervals within a data frame.

In a typical OFDM data transmission system such as one for implementing digital television or a wireless local area network (WLAN), data is transmitted in the OFDM signal in groups of symbols known as data frames. This concept is shown in FIG. 2 where a data frame 50 includes M consecutive symbols 52a, 52b, . . . , 52M, each of which includes a guard interval, $T_g$, as well as the OFDM symbol interval, TS. Therefore, each symbol has a total duration of $T_g + T_s$ seconds. Depending on the application, data frames can be transmitted continuously, such as in the broadcast of digital TV, or data frames can be transmitted at random times in bursts, such as in the implementation of a WLAN.

Figure 3:
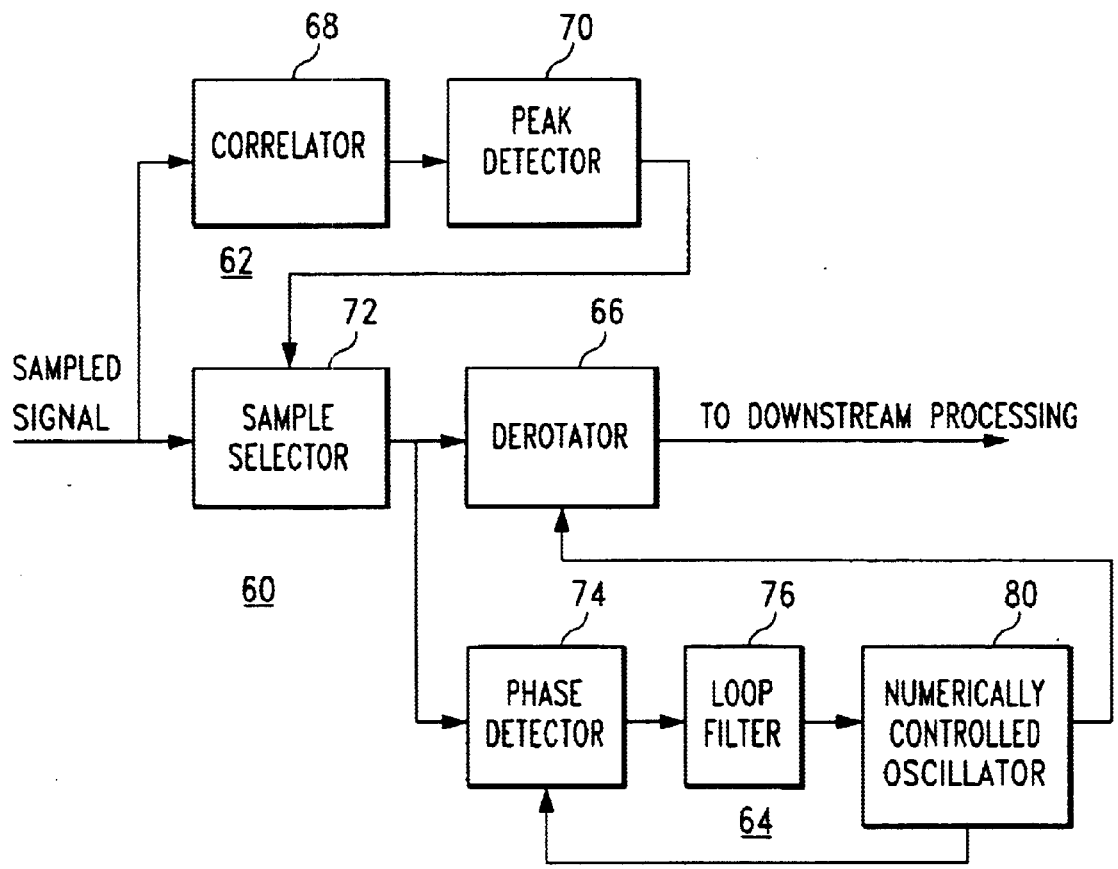
FIG. 3 is a block diagram of an exemplary local oscillator frequency correction system of the present invention.
Figure 4:
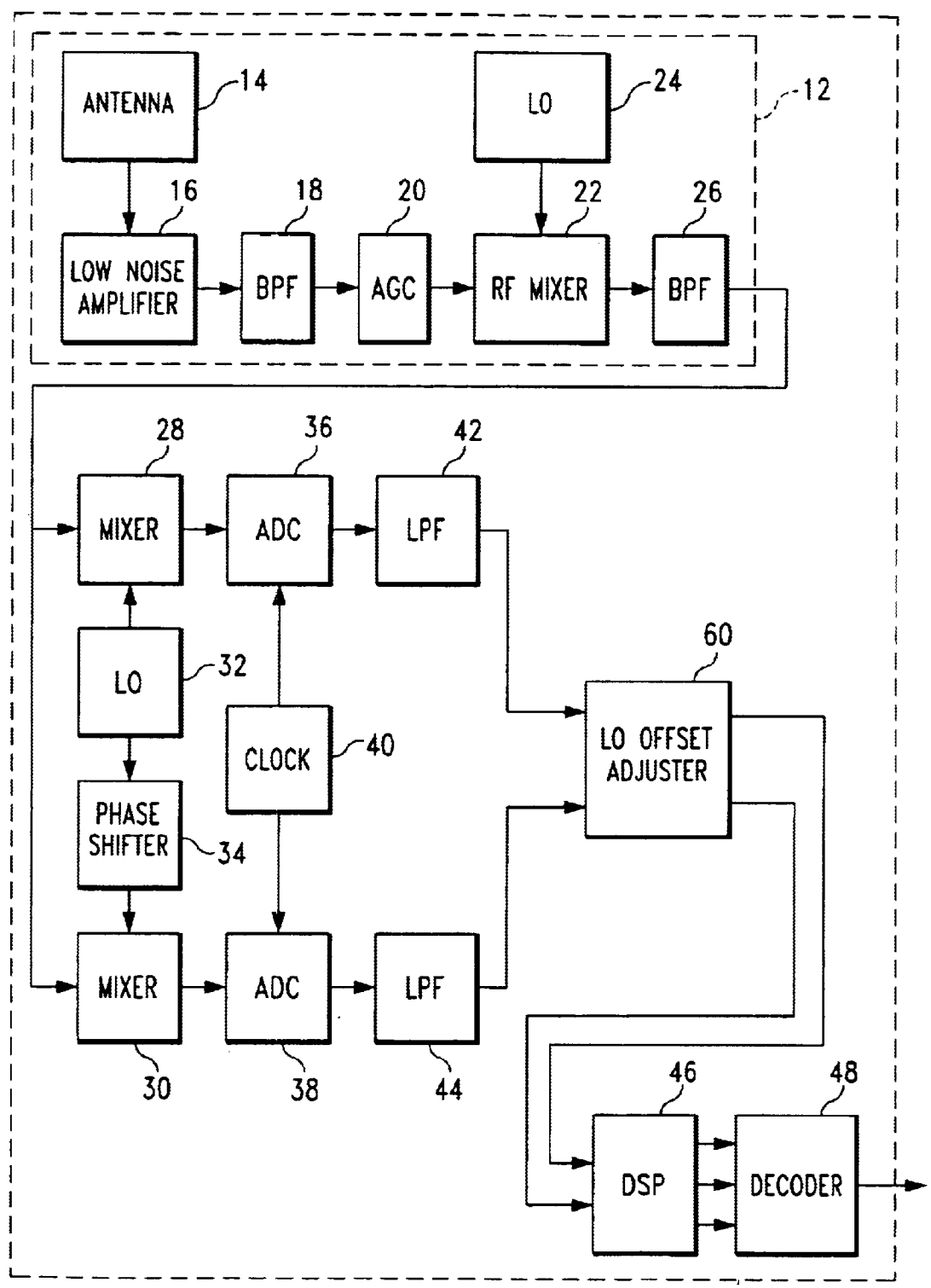
FIG. 4 is a block diagram illustrating the present invention as integrated with the conventional OFDM receiver of FIG. 1.

Referring now to FIG. 3, an exemplary embodiment of the present invention is shown. Although the present invention is illustrated as being distinct from the elements of OFDM receiver of FIG. 1, one skilled in the art will readily devise that the present invention may be integrated with the elements of the OFDM receiver, as shown in FIG. 4 and discussed below. However, the present invention is illustrated as a distinct local oscillator frequency correction loop for clarity, ease of reference, and to facilitate an understanding of the present invention.

The present invention operates in a receiver that conforms to the proposed ETSI-BRAN HIPERLAN/2 (Europe) and IEEE 802.11a (USA) wireless LAN standards, herein incorporated by reference. However, it is considered within the skill of one skilled in the art to implement the teachings of the present invention in other OFDM systems.

Figure 5:
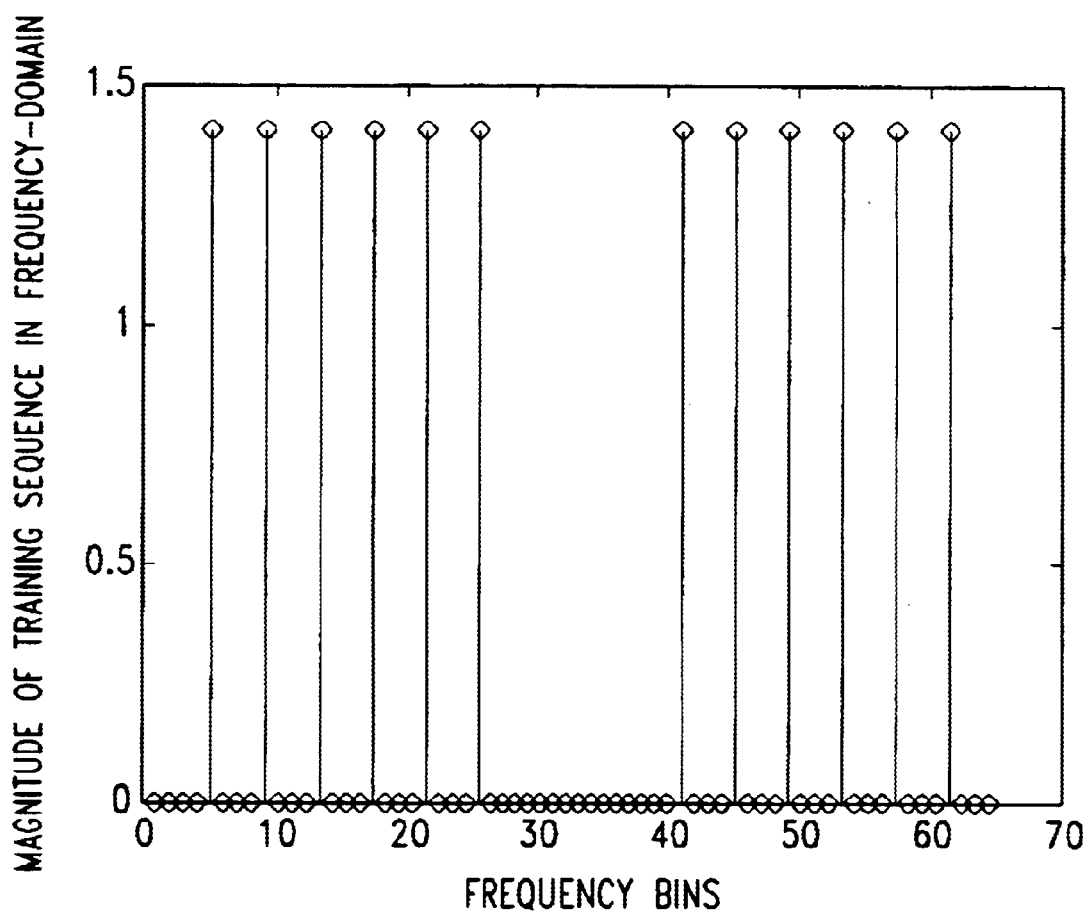
FIG. 5 is a diagram of an exemplary training sequence in the frequency domain.
Figure 6:
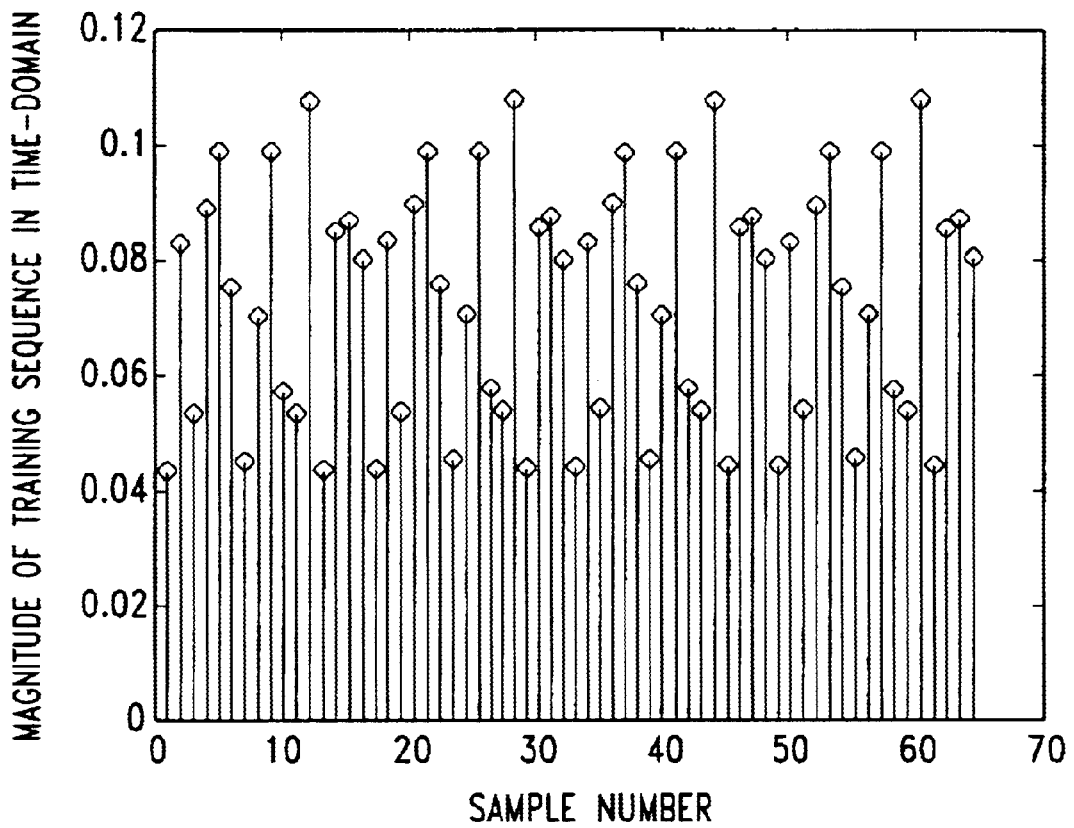
FIG. 6 is a time domain representation of the training sequence of FIG. 5.

The above-identified wireless LAN standards propose the use of a training sequence for detection of OFDM transmissions. Briefly, the training sequence (e.g., training sequence A or B) includes a series of short OFDM training symbols (having known amplitudes and phases) that are transmitted over a predetermined number of pilot sub-carriers or bins (e.g., 12 pilot sub-carriers). All the other sub-carriers (e.g., 52 sub-carriers) remain at zero during the transmission of the training sequence. Although use of the training sequence of the above-identified LAN standards is discussed below, use of alternative training sequences and symbols is considered within the scope of the invention as defined by the appended claims. Frequency domain and time domain representations of an exemplary training sequence are shown in FIGS. 5 and 6.

Referring now to FIG. 3, an oscillator frequency correction network or system 60 is shown. It should be noted that system 60 may be embodied in software, hardware, or some combination thereof. System 60 includes a derotator or complex multiplier 66 that receives a sampled OFDM signal via a sample selection loop 62 and a phase lock loop 64. As discussed above, the sampled OFDM signal contains in-phase ($q_i$) and quadrature ($p_i$) samples that represent the real and imaginary-valued components, respectively, of the complex-valued OFDM signal, $r_i = q_i + jp_i$. Ideally, derotator 66 multiplies the sampled or digitized OFDM signal with a local signal (i.e., carrier signal) generated by a numerically controlled local oscillator 80 to bring the digitized OFDM signal down to baseband. However, the derotator output may not be exactly at baseband. One reason for this discrepancy is that the frequency of local oscillator 80 may not match the transmitter oscillator frequency. Thus, there may be a local oscillator frequency offset (i.e., carrier frequency offset) with respect to the transmitter oscillator frequency. The present invention is directed to compensating for the local oscillator frequency offset through the operation of sample selection loop 62 and phase lock loop 64.

Sample selection loop 62 includes a correlator module 68, a peak detector module 70, and a sample selector module 72. More specifically, correlator module 68 is coupled to a source of a sampled OFDM signal and an input of peak detector module 70. An output of peak detector module 70 is coupled to an input of sample selector module 72 which, in turn, is coupled to the source of a sampled OFDM signal and to inputs of derotator 66 and phase locked loop 64.

Phase locked loop 64 includes a phase detector module 74, a loop filter 76, and a numerically controlled oscillator 80. More specifically, phase detector module 74 is coupled to an output of sample selector module 72 and an output of a numerically controlled oscillator 80 as well as an input of a loop filter module 76. Loop filter module 76 is coupled to an input of numerically controlled oscillator 80 which, in turn, is coupled to an input of derotator 66 and fed back to an input of phase detector 74.

In operation, sample selection loop 62 extracts the location of a training symbol in the received OFDM signal and delays the OFDM signal in order for the phase locked loop 64 to analyze the phase of a sample that is located at a predetermined location within the training symbol. More specifically, correlator module 68 correlates the received digitized OFDM signal with time-domain samples of a known training sequence (e.g., training sequence B of the above-mentioned wireless LAN standards) stored in a local memory. A maximum correlation will occur when the stored training sequence matches up with a training sequence contained in the digitized signal. Thus, a peak in the power of the correlation output may be utilized to determine when the received signal coincides with the stored training sequence.

Peak detector module 70 searches the correlation sequence received from correlator module 68 for a peak in the power of the correlation sequence. The output of correlator module 68 is a complex signal since the inputs (i.e., the stored training sequence and the digitized signal) are complex. Peak detector module 70 may compute the power or magnitude of each sample of the correlated signal in one of two ways in accordance with the design of a particular OFDM receiver. First, peak detector module 70 may compute the squared magnitude (i.e., the power) of each complex sample of the correlated signal to generate a real number indicating the power of the correlated signal. Second, peak detection module 70 may obtain the magnitude (as opposed to the squared magnitude) of each complex sample of the correlated signal. Afterwards, peak detector module 70 searches the correlation power sequence to identify the sample having the largest power or magnitude value. Once the largest value has been identified, peak detector module 70 outputs the index of the peak location to sample selector module 72. The index is used by system 60 as a reference point. Within the training sequence certain samples are known to have the same phase as local oscillator 80 if there is not a local oscillator frequency offset present. However, if a frequency offset is present the samples will have a phase offset with respect to the phase of the signal generated by local oscillator 80. The phase offset can be used by the phase locked loop 64 of system 60 to generate a frequency error signal to adjust the frequency of local oscillator 80 such that the local oscillator frequency offset converges towards zero.

Sample selection module 72 receives the index of the peak location from peak detector module 70 and uses the index to delay the received digitized OFDM signal such that predetermined samples, within the training sequence carried by the digitized signal, can be analyzed by the phase detector module 74 of phase locked loop 64, as described in further detail below. The predetermined samples are known to be located a fixed distance or time period from the correlation peak and, absent a local oscillator frequency offset, have the same phase as local oscillator 74. The predetermined OFDM samples and the phase of the local oscillator are selected in accordance with the design of a particular OFDM receiver. Sample selection module 72 may include a tap delay line and FIFO buffer arrangement or any similar selective delay arrangement as known by those skilled in the art.

Phase detector module 74 tracks the passage of the digitized OFDM signal output by sample selector module 72 and analyzes predetermined samples after the passage of a number of samples. For example, phase detector module 74 may include a counter that counts the number of samples output from sample selector module 72 and triggers the phase detector module 74 to capture a sample after reaching a predetermined count. The time period between triggers is known and utilized by sample selector 72 to delay the digitized OFDM signal such that phase detector module 74 acquires the predetermined samples of the training sequence. Once a sample is selected, phase detector module 74 computes the phase of the sample and the phase the signal generated by local numerically controlled oscillator 80. Afterwards, phase detector module 74 generates a phase offset error by calculating the difference in phase between the selected sample and the signal generated by the local oscillator 74. The phase offset error is provided to a filter 76 that generates a local oscillator frequency error. The local oscillator frequency error, in turn, is provided to local oscillator 80 to adjust the frequency of local oscillator 80 such that the local oscillator frequency offset (i.e., carrier frequency offset) converges towards zero and the derotated signal output from derotator 66 approaches baseband. The phase offset error is preferably held constant by phase lock loop 64 after the counter within phase detector module 74 resets and is counting towards the predetermined trigger value.

It should be noted that derotator 66 may further adjust (via internal filters or the like) the received phase error offset to more precisely derotate the digitized signal from passband to baseband.

Referring now to FIG. 4, the present invention is integrated with the conventional OFDM receiver of FIG. 3 as shown. More specifically, system 60 is coupled to the outputs of LPFs 42 and 44 and to the inputs of DSP 46. With this arrangement, system 60 receives OFDM samples from LPFs 42 and 44, corrects any detected carrier frequency offset, and outputs the corrected OFDM samples to DSP 46 for further processing.

While the present invention has been described with reference to the preferred embodiments, it is apparent that that various changes may be made in the embodiments without departing from the spirit and the scope of the invention, as defined by the appended claims.

What is claimed is:

1. A method of correcting a carrier frequency offset in an Orthogonal Frequency Division Multiplexing (OFDM) receiver in the time-domain, the method comprising the steps of:

receiving an OFDM signal having a reference symbol;

correlating the OFDM signal with a stored copy of the reference symbol;

outputting an index of a correlation peak;

sampling the OFDM signal at a predetermined distance from the index of the correlation peak to produce a reference sample;

computing a phase difference between the reference sample and a locally generated carrier frequency; and generating a carrier frequency offset error in response to the computed phase difference.

2. The method of claim 1, further comprising the steps of:

adjusting the locally generated carrier frequency to correct the carrier frequency offset error; and derotating the received OFDM signal from passband to baseband using the locally generated carrier frequency.

3. The method of claim 1, wherein the step of correlating includes the steps of:

outputting a sequence of correlation samples representing the correlation of the stored reference symbol with the OFDM signal;

determining the power of each correlation sample in the sequence; and determining the index of the correlation peak by locating a correlation sample in the sequence having a maximum power value.

4. The method of claim 3, wherein the step of determining the power of each correlation sample includes the step of computing a squared magnitude of each correlation sample.

5. The method of claim 3, wherein the step of determining the power of each correlation sample includes the step of obtaining a magnitude of each correlation sample.

6. The method of claim 1, wherein the step of generating a carrier frequency offset error includes the step of passing the computed phase difference through a loop filter.

7. An Orthogonal Frequency Division Multiplexing (OFDM) receiver for receiving an OFDM signal having a training symbol, the OFDM receiver comprising:
- an analog to digital converter (ADC) that converts a received OFDM signal into a plurality of digital samples, the plurality of digital samples including a plurality of training symbol samples;
- an oscillator that generates a digital signal;
- a derotator coupled to the oscillator, the derotator mixing the digital OFDM samples with the digital signal such that the digital OFDM samples are downconverted from passband to baseband;
- a correlator coupled to the ADC the correlator correlating the digital samples output from the ADC with a stored copy of the training symbol to generate a plurality of correlation samples;
- a correlation peak detector coupled to correlator, the correlation peak detector outputting an index of a correlation peak in response to the detection of a correlation peak in the plurality of correlation samples;
- a sample selector coupled to the ADC and the correlation peak detector, the sample selector selectively delaying the digital samples output from the ADC for a predetermined time in response to reception of the index of the correlation peak from the correlation peak detector; and
- a phase detection unit coupled to the sample selector and the oscillator, the phase detection unit acquiring a predetermined training symbol sample from the delayed digital samples, calculating a phase difference between the predetermined training symbol sample and the digital signal of the oscillator, and generating a control signal for adjusting the frequency of the oscillator to reduce the calculated phase difference.

8. The OFDM receiver of claim 7, wherein the predetermined time is selectively set by the sample selector such that the phase detection unit acquires the predetermined training symbol sample.

9. The OFDM receiver of claim 7, wherein the correlation peak detector calculates a correlation power for each correlation sample and detects the correlation peak by detecting a maximum power value in the plurality of correlation samples.

10. The OFDM receiver of claim 9, wherein the correlation power is a squared magnitude of each correlation.

11. The OFDM receiver of claim 9, wherein the correlation power is a magnitude of each correlation.

12. The OFDM receiver of claim 7, wherein the predetermined training symbol sample is in phase with digital signal generated by the oscillator when the oscillator is synchronized with a carrier frequency of the OFDM signal.

13. An apparatus for synchronizing a local oscillator frequency of an Orthogonal Frequency Division Multiplexing (OFDM) receiver with a carrier frequency generated by an OFDM transmitter, the apparatus comprising:
- means for receiving an OFDM signal transmitted at a carrier frequency;
- means for extracting a reference point from the OFDM signal;
- means for sampling the OFDM signal a predetermined distance from the reference point;
- means for calculating a phase difference between the sample and the local oscillator frequency; and
- means for synchronizing the local oscillator frequency with the carrier frequency of the OFDM signal by adjusting the local oscillator frequency such that the phase difference is reduced.

14. The apparatus of claim 13, wherein the apparatus is incorporated into a receiver that operates in a wireless LAN.

15. The apparatus of claim 13, wherein the means for extracting comprises:
- means for correlating the OFDM signal with a stored copy of a reference symbol to generate a plurality of correlation samples; and
- means for detecting a location of a correlation peak in the plurality of correlation samples; and
- means for setting the location of the correlation peak as the reference point.

16. The apparatus of claim 15, wherein the means for detecting comprises:
- means for determining the power of each correlation sample in the plurality of correlation samples; and
- means for determining the location of the correlation peak by locating a correlation sample in the sequence having a maximum power value.

17. The apparatus of claim 16, wherein the means for determining the power of each correlation sample includes at least one of a means for computing a squared magnitude of each correlation sample and a means for obtaining a magnitude of each correlation sample.

18. The apparatus of claim 13, wherein the predetermined distance is set such that at least one reference symbol within the OFDM signal is sampled, the reference symbol sample being in phase with the oscillator frequency when the oscillator is synchronized with the carrier frequency.

* * * * *